United States Patent [19]

Canter et al.

[11] 4,162,241

[45] Jul. 24, 1979

[54] POLYVINYL CHLORIDE THERMOPLASTIC BLEND COMPOSITIONS HAVING IMPROVED GLASS TRANSITION TEMPRATURES

[75] Inventors: Nathan H. Canter, Edison; Neville G. Thame, Montclair, both of N.J.

[73] Assignee: Exxon Research & Engineering Co., Florham Park, N.J.

[21] Appl. No.: 787,368

[22] Filed: Apr. 14, 1977

[51] Int. Cl.$^2$ ............................ C08L 23/16; C08L 27/06
[52] U.S. Cl. ............................ 260/30.8 R; 260/23 XA; 260/28.5 D; 260/31.8 M; 260/33.6 PQ; 260/33.64 A; 260/42.49; 525/211; 525/232; 525/353
[58] Field of Search ............... 260/79.2 R, 888, 897 C, 260/30.8 R, 31.8 M, 33.64 A

[56] References Cited

U.S. PATENT DOCUMENTS

| | | | |
|---|---|---|---|
| 3,642,728 | 2/1972 | Canter | 260/79.3 R |
| 3,694,521 | 9/1972 | Shaw | 260/878 B |
| 3,836,511 | 9/1974 | O'Farrell et al. | 260/79.3 R |
| 3,847,854 | 11/1974 | Canter et al. | 260/23.7 M |
| 3,870,841 | 3/1975 | Makowski et al. | 260/23.7 R |
| 3,903,039 | 9/1975 | Gorbaty et al. | 260/33.4 PQ |

*Primary Examiner*—Carman J. Seccuro
*Attorney, Agent, or Firm*—Richard E. Nanfeldt

[57] ABSTRACT

This patent relates to thermoplastic blend compositions having improved stiffness and increased glass transition temperature, wherein a major portion of polar thermoplastic resin is compounded with a minor portion of a neutralized sulfonated polymer. The neutralized sulfonated polymers of the present invention included sulfonated polystyrene butadiene copolymers, sulfonated butyl rubber, sulfonated EPDM and other sulfonated elastomeric polymers. The thermoplastic polar resins having a halogen-carbon bond include polyvinyl chloride.

8 Claims, 11 Drawing Figures

POLYVINYL CHLORIDE THERMOPLASTIC BLEND COMPOSITIONS HAVING IMPROVED GLASS TRANSITION TEMPRATURES

FIELD OF THE INVENTION

This patent relates to thermoplastic blend compositions having improved stiffness and increased glass transition temperatures, wherein a major portion of a polar thermoplastic resin is compounded with a minor portion of a neutralized sulfonated polymer. The neutralized sulfonated polymers of the present invention included sulfonated polystyrene butadiene copolymers, sulfonated butyl rubber, sulfonated EPDM and other sulfonated elastomeric polymers. The thermoplastic polar resins having a halogen-carbon bond include polyvinyl chloride.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically cross-linked elastomer at room temperature having substantially improved physical properties over an unsulfonated elastomer. However, these sulfonated elastomers, unlike these sulfonated elastomers may be processed like a conventional thermoplastic at elevated temperatures under a shear force in the presence of selected plasticizers (preferential in their interaction toward the sulfonate moeities) which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally a domain plasticizer can be incorporated into the composition, wherein the domain plasticizer reversibly disrupts the association of the sulfonate groups at the temperature of forming.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

These four aforementioned patents are related to sulfonated polymers, wherein the sulfonated polymer is a major portion of the compositions. The present invention relates to the modification of polar thermoplastic resins with a minor portion of a sulfonated polymer in order to improve the glass transition temperature as well as to improve the stiffness and alter the melt processability of the thermoplastic resin.

U.S. Pat. application Ser. Nos. 542,502 and 524,512, of R. D. Lundbert, H. S. Makowski and J. Bock filed on November 18, 1974, describe the blending of a minor portion of a crystalline polyolefinic material with a neutralized sulfonated elastomeric polymer in an attempt to improve both the rheological and physical properties of the elastomeric polymer. The selection of the use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers in combination with an elastomeric polymer increase the hardness of the composition, these fillers deteriorate the melt viscosity of the resultant composition. The compositions of these two applications having a major portion of the sulfonated polymer and a minor portion of a non-polar thermoplastic.

The unique and novel compositions of the present invention provide compounds with improved glass temperature and stiffness which was previously unattainable by practicing the teachings of the aforementioned patents and applications. The blend compositions of the present invention solves the problem of improving the glass transition temperature and stiffnes for polyvinyl chloride for use in hot water pipes.

For example, the incorporation of 10 parts per hundred by weight of a neutralized sulfonated EPDM into 100 parts of a polyvinyl chloride resin increases the glass transition temperature by about 14° C., thereby improving the upper service temperature limit of the thermoplastic blend.

SUMMARY OF THE INVENTION

It has been found surprisingly that blend compositions of a major portion of a polar thermoplastic resin having a halogen-carbon bond and a minor portion of a neutralized sulfonated polymer has improved glass transition temperatures and stiffness as compared to the unmodified thermoplastic resin.

Accordingly, it is an object of our present invention to provide thermoplastic blend compositions of a polar thermoplastic resin having a halogen-carbon bond and a neutralized sulfonated polymer having improved physical properties and increased glass transition temperatures.

BRIEF DESCRIPTION OF THE FIGURES

The figures are presented in conjunction with the detailed description to more fully graphically illustrate the results of the examples.

GENERAL DESCRIPTION OF THE INVENTION

The present invention relates to improved blend compositions of a polar thermoplastic resin and a neutralized sulfonated elastomeric polymer, wherein the resultant composition has improved physical properties and increased glass transition temperatures as compared to an unmodified thermoplastic resin. In particular, the thermoplastic resins encompassed by this present invention have a carbon-halogenated bond.

The elastomeric polymers of the present invention are derived from synthetic and material polymers having olefinic unsaturation sites, wherein the polymer has from about 0.1 to about 5.0 mole percent olefinic unsaturation. The unsaturation sites can be in the polymer backbone, pendant therefrom or cyclic.

In particular, the unsaturated polymers of this present invention include low unsaturated elastomeric polymers such as butyl rubbers, halo-butyl rubbers or EPDM terpolymers. Other elastomeric polymers encompassed by this invention are partially hydrogenated polyisoprene, partially hydrogenated polybutadiene, polyisobutylene, styrene butadiene copolymers or isoprene-styrene random copolymers.

Highly saturated elastomeric materials may also be used when sulfonated materials such as sulfonated natural rubber, polyisoprene, polybutadiene, polychloroprene, styrene-butadiene rubber, and styrene-butadiene block or graft copolymers can be used.

The expression "Butyl rubber" as employed in the specification and claims is intended to include copolymers made from a polymerization reacted mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

These sulfonated copolymers and terpolymers of isobutylene fall within the scope of the present invention. These include copolymers of isobutylene (60 to 99.9%) and cyclopentadiene (0.5 to 40%), or methyl cyclopentadiene (0.1 to 40%) or mixtures thereof. Terpolymers of isobutylene (60 to 99.8%) with isoprene (0.2 to 40%) and cyclopentadiene (0.2 to 40%) or methyl cyclopentadiene may be used. The preferred composition of the terpolymer is 90 to 99.8% isobutylene, 0.1 to 5% isoprene, and 0.1 to 5% cyclopentadiene. Such compositions within this preferred range insured adequate rubbery properties (after sulfonation) of the depressed rubber phase.

Illustrative of such a Butyl rubber is Exxon Butyl 218 (Exxon Chemical Co.), having a viscosity average molecular weight of about 450,000, a mole percent unsaturation of about 1.5% and a Mooney viscosity of about 55 at 260° F. at 8 minutes (after a 1 minute preheat) at the test temperature.

Halogenated Butyl rubber is commercially available and may be prepared by halogenating Butyl rubber in a solution containing between 1 to 60% by weight of Butyl rubber in a substantially inert $C_5$–$C_8$ hydrocabon solvent such as pentane, hexane, heptane, etc. and contacting this Butyl rubber cement with a halogen gas for a period of about 25 minutes, whereby halogenated Butyl rubber and a hydrogen halide are formed, the copolymer containing up to one halogen atom per double bond in the copolymer. The preparation of halogenated Butyl rubber is old in the art, see e.g. U.S. Pat. No. 3,099,644 which is incorporated herein by reference. This invention is not intended to be limited in any way by the manner in which Butyl rubber is halogenated, and both chlorinated and brominated Butyl rubber are suitable for use in this invention.

Illustrative of halogenated Butyl rubbers is Exxon Butyl HT-10-66 (a chlorinated Butyl rubber containing about 1.3 wt. percent chlorine, having about 1.7 mole percent unsaturation and a viscosity average molecular weight of about 357,000).

Low molecular weight Butyl rubbers, i.e. Butyl rubbers having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM-D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 45 to about 80 wt. % ethylene and about 2 to about 10 wt. % of a diene monomer, the balance of the polymer being propylene. Preferably, the polymer contains about 50 to about 75 wt. % ethylene, e.g. 50 wt. % and about 2.6 to about 9.0 wt. % diene monomer, e.g. 5.0 wt. %. The diene monomer is preferably a non-conjugated diene. The $\overline{M}n$ of the terpolymer is preferably about 10,000 to about 200,000; more preferably abou 15,000 to about 100,000; and most preferably about 20,000 to about 60,000. The Mooney viscosity of the terpolymer at (1+8) minutes at 212°0 F. is preferably 5 to 60, more preferably 10 to 50 and most preferably 20 to 50, e.g. 40.

The $\overline{M}v$ of the EPDM is preferably below about 350,000 and more preferably below about 300,000, e.g. 270,000. The $\overline{M}w$ of the EPDM is preferably below about 500,000, and more preferably below about 350,000, e.g. 343,000.

Illustrative of these non-conjugated diene monomers which may be used in the EPDM terpolymer are hexadiene, dicyclopentadiene, ethylidene norbornene, methylene norbornene, propylidene norbornene and methyl tetrahydroindene. A typical EPDM is Vistalon 2504 (Exxon Chemical Co.), a terpolymer having a Mooney viscosity at (1+8) minutes at 260° F. of about 40 and having 50 wt. % ethylene, 45 wt. % of propylene, and 5.0 wt. % of 5-ethylidene-2-norbornene with an $\overline{M}n$ of about 47,000, an $\overline{M}v$ of about 145,000 and an $\overline{M}w$ of about 174,000.

Vistalon 3708 (Exxon Chemical Co.) is a terpolymer having a Mooney viscosity at (1+8) minutes at 260° F. of about 45-55 and having about 64 wt. % of ethylene, about 3.3 wt. % of 5-ethylidene-2-norbornene; and about 32.7 wt. % of propylene with an $\overline{M}n$ of about 53,000, an $\overline{M}w$ of about 343,000, and an $\overline{M}v$ of about 270,000.

Vistalon 6505 (Exxon Chemical Co.) is a terpolymer having a Mooney viscosity at (1+8) minutes at 260° F. of about 69-84 and having about 53 wt. % of ethylene, about 9.0 wt. % of 5-ethylidene-2-norbornene and about 38 wt. % of propylene. The $\overline{M}n$ is about 55,000.

Nordell 1320 (DuPont) is another EPDM terpolymer having a Mooney viscosity at (1+8) miutes at 260° F. of about 15 and having about 53 wt. % of ethylene, about 3.5 wt. % of 1,4 hexadiene, and about 43.5% of propylene.

The polar thermoplastic resins of the present instant invention include polyvinyl chloride, polyvinyl bromide or polyvinyl iodide and mixtures thereof.

The polar thermoplastic resin has halogen-carbon bonds, wherein the halogen is selected from the group consisting essentially of $F^-$, $Cl^-$, Br, or I, the preferred halogen carbon bond is Cl-C.

Polyvinyl chloride resins can be classified into three categories based on bulk density; that is low, intermediate and high bulk density. Low bulk density resins have a density of less than about 0.55 g/ml. Intermediate bulk density resins are generally those resins having a bulk density of about 0.55 to about 0.65 g/ml and high bulk density resins are those resins having a bulk density in excess of about 0.65 g/ml.

The term polyvinyl chloride as used in this invention is meant to include co- and terpolymers of vinyl chloride with comonomers such as vinyl acetate, vinyl formate, alkyl vinyl ethers, ethylene, propylene, butylenes, vinylidene chloride, alkyl acrylates, and methacrylates, alkyl maleates, alkyl furnarates, maleic anhydride, etc. Preferably, at least 80% and more preferably 100% of the monomers to be polymerized will be vinyl chloride monomer. These resins have a weight average molecular weight of about 20,000 to about 120,000 and more preferably from about 50,000 to about 100,000. Inherent viscosity (as measured by ASTM-D-1243-60; Method A) will generally be in the range of about 0.5 to about 1.5; more preferably in the range of about 0.8 to about 1.35.

In carrying out the present invention, an olefinically unsaturated polymer is sulfonated with a sulfonating agent selected from the group consisting of a mixture of acetyl sulfate generated in situ from acetic anhydride and concentrated sulfuric acid, acyl sulfate, or a sulfur trioxide donor complexed with a Lewis base containing oxygen, nitrogen or phosphorus.

The term "sulfur trioxide donor" as used in the specification means a compound containing available sulfur trioxide. Illustrative of such sulfur trioxide donors are $SO_3$, chlorosulfonic acid, fluorosulfonic acid, sulfuric acid, oleum, etc. The term "complexing agent" as used in the specification means a Lewis base suitable for use in the practice of this invention, wherein a Lewis base is an electron pair donor.

Illustrative of Lewis bases suitable for use as complexing agents are certain phosphorus compounds. While the phosphorus compound may be either inorganic or organic, it is preferred that the phosphorus compound be an organic compound having the general formula:

wherein A, B and C are independently selected from the group consisting of oxygen and —$CH_2$— and $R_1$, $R_2$ and $R_3$ are independently selected from the group consisting of $C_1$ to $C_{10}$ alkyl, aryl, alkaryl or aralkyl. Various organic phosphites, phosphinites, phosphinates, phosphates, phosphonates, phosphonites, and phosphines may be used as the complexing agent.

Other Lewis bases suitable as complexing agents are those Lewis bases which contain oxygen or nitrogen.

The nitrogen containing Lewis bases which form active complexes with sulfur trioxide donors and which are suitable for sulfonation of the unsaturated polymers of this invention have the general formula:

wherein $R_1$, $R_2$, $R_3$ and $R_5$ are independently selected from the group consisting of hydrogen or $C_1$ to $C_{36}$ alkyl, aryl, alkaryl, aralkyl or mixtures thereof, with the proviso that where $R_1$ and $R_2$ are hydrogen, $R_3$ may not be hydrogen and $R_4$ is selected from the group consisting of $C_3$ to $C_{36}$ alkylene. Broadly speaking, the nitrogen containing Lewis base may be any primary, secondary or tertiary organic amine or a cyclic organic amine. Where the $R_1$, $R_2$, $R_3$, $R_4$ or $R_5$ radicals contain more than two carbon atoms, they may be heterogeneous organic radicals containing oxygen, chlorine, nitro groups or mixtures thereof. That is $R_1$, $R_2$, $R_3$, $R_4$ and $R_5$ may be ethereal, contain substituted halogen atoms, nitro groups or comprise both ethereal and substituted groups. With reference to $R_1$, $R_2$, $R_3$, $R_4$, and $R_5$ of these formulae, the term "substituted analogues" as used in the specification means R groups as described and substituted with the substituents referred to above. For the purpose of this invention where $R_1$, $R_2$, $R_3$, $R_4$ and $R_5$ are ethereal, they shall be considered to fall in the class of "substituted analogues". In cases where $R_1$, $R_2$ and $R_3$ contain aryl, alkaryl or aralkyl groups, the use of excess sulfur trioxide donor is required to compensate for any sulfonation of the aromatic units.

Illustrative of these nitrogen containing Lewis bases are trimethylamine, triethylamine, dimethylaniline, diethylaniline, piperidine, morpholine, N-ethylmorpholine, diethylaminoacetal, and 2-chlorotriethylamine.

Suitable solvents for the preparation of these complexes are chlorinated hydrocarbons. The preferred concentration of complex in solution is from 5 to 20% by weight, more preferably 10 to 15%. The complexes may also be prepared by direct addition of the reagents, if precautions are taken to dissipate the heat evolved. The reactions of complexes of $SO_3$ with molecules containing nitrogen and the unsaturation of polymer backbones have been found to be non-quantitative. Therefore, the use of excess complex is desirable in such reactions.

Oxygen containing Lewis bases have been found useful for complexing sulfur trioxide donor to facilitate reaction with the unsaturation of polymer molecules. The general formulae of such bases are:

wherein $R_1$ and $R_2$ are independently selected from the group consisting of $C_2$–$C_{36}$ alkyl, aryl, alkaryl, or aralkyl and $R_3$ is $C_3$–$C_{36}$ alkylene, $R_3$ may be substituted alkylene. The substituents may be $C_1$ to $C_{20}$ alkyl, aryl, alkaryl, or aralkyl. For $R_1$, $R_2$ or $R_3$ greater than $C_2$, halogen, nitro groups and ethereal oxygen atoms may also be present. With reference to $R_1$, $R_2$ and $R_3$, the term "substituted analogues" as used in the specification and claims means $R_1$, $R_2$ and $R_3$ substituted as described above. The presence of aryl, alkaryl or aralkyl groups in the base demands the use of excess $SO_3$ since some of the $SO_3$ is used in sulfonation of the aromatic groups.

Illustrative of the oxygen containing Lewis bases suitable for use in the practice of this invention are tetrahydrofuran, paradioxane, 2,3-dichloro-1,4-dioxane, metadioxane, 2,4-dimethyl-1,3-dioxane, 2-phenyl-1,3-dioxane, diethyl ether, trioxane and bis (2-dichloroethyl)-ether. The preferred oxygen containing bases are p-dioxane, tetrahydrodfuran and bis-(2-dichloroethyl) ether.

Other oxygen containing Lewis bases suitable as complexing agents are esters having the general formula:

wherein $R_1$ and $R_3$ are $C_1$ to $C_{10}$ alkyl, phenyl or benzyl. Illustrative of such esters are benzyl acetate, butyl acetate, butyl propionate, methyl benzoate, hexyl acetate, isobutyl benzoate, ethyl-o-bromobenzoate, p-nitrophenyl acetate, ethyl-n-butyrate, ethyl stearate, and ethyl phenyl acetate.

The molar ratio of $SO_3$ donor to complexing agent may be as high as 15 to 1; preferably less than about 9:1, more preferably about 4:1 to about 1:1, e.g. 2:1.

The preferred solvents for preparation of the complexes of sulfur trioxide donor with complexing agents containing oxygen are chlorinated hydrocarbons containing complexing agent. Illustrative of such chlorinated solvents are carbon tetrachloride, dichloroethane, chloroform, and methylene chloride. The complexes may also be prepared by direct addition of reagents if precautions are taken to dissipate evolved heat.

The reactions of ethereal complexes of $SO_3$ with the unsaturation of polymer chains has been found to be nonquantitative. Therefore, the use of excess complex is desirable to give the required amount of sulfonation.

Other suitable sulfonating agents are the acyl sulfate, which are selected from the group of acetyl, propionyl, butyryl, or benzoyl sulfate, in particular acetylsulfate. The acyl sulfate may be produced by reacting concentrated sulfuric acid with an acid anhydride. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternately, sulfur trioxide may be reacted with acetic acid to form the acetyl sulfate. It should be pointed out that neither the sulfonating agent nor the manner of sulfonation is critical, provided that the sulfonating method does not degrade the polymer backbone or lead to cross-linking of the polymer chains.

In the practice of this invention, the polymer to be sulfonated is dissolved in a suitable solvent and reacted with the sulfonating agent. The solvent medium must be a neutral one for the rubber and the sulfonating agent. The solvent is preferably an aromatic hydrocarbon, an aliphatic hydrocarbon, or a halogenated aromatic hydrocarbon. Illustrations of these solvents are: pentane, cyclohexane, hexane, heptane and homologues thereof.

Sulfonation of the polymer is conducted at a temperature between $-100°$ and $+100°$ C. Sulfonation occurs when the sulfonating agent is added to the polymer solution. The sulfonating agent is preferably dissolved in a suitable solvent, or may be added directly without solvent. Reaction time may be about 5 minutes to about 60 minutes, more preferably about 30 minutes, wherein the produce remains soluble throughout the reaction period.

The acid form of the sulfonated elastomeric is quenched with a liquid aliphatic alcohol such as methanol, ethanol, or isopropanol, an aromatic phenol, or water.

The amount of desirable sulfonation depends on the particular application. Preferably, the elastomeric polymer is sulfonated at about 10 to about 100 meq. $SO_3H/100g$ of polymer, more preferably at about 15 to about 40 meq. $SO_3H/100$ grams of polymer, and most preferably at about 20 to about 35 meq. $SO_3H/100$ grams of polymer. The meq. of $SO_3H/100$ grams of polymer was determined by dissolving the acid form of the sulfonated polymer in a mixed solvent of 95 parts of toluene and 5 parts of methanol at a concentration level of 50 grams per liter of solvent. The acid form is titrated with sodium ethoxide to an Alizarin Thymol-phthalein endpoint. Sulfur analysis was done by Dietert Analysis.

The acid form of the sulfonated polymer is isolated from the cement as a crumb by steam stripping the cement. The crumb can be dried and subdivided into small particles. The subdivided crumb is redissolved in a solvent mixture of 95 parts by volume of toluene and 5 parts by volume of methanol at a concentration level of about 5 to about 25 grams per 100 ml. of mixed solvent, more preferably at about 10 to about 20.

Polymers containing unsaturation and sulfonic acid groups have been found to be somewhat deficient in thermal stability. Therefore, it is desirable to neutralize at least a portion of the sulfonic acid as part of the manufacturing of sulfonated elastomeric polymer. Neutralization further improves the physical properties of the sulfonated polymer.

In preparing the ionomer it is not necessary to neutralize every sulfonic acid group. Preferably, at least 1% of the sulfonic acid groups are neutralized, though 100% of the acids may be neutralized if desired, more preferably about 2 to about 90% of the sulfonic acid groups are neutralized, most preferably about 50 to about 90% are neutralized.

The neutralizing agents of the present invention are metallic salts of carboxylic acids or hydroxides, wherein the metallic ion of the metallic salt is selected from the group consisting of Groups IA, II-A, I-B, II-B, $Fe^{+3}$, $Sb^{+3}$, or $Pb^{+4}$ of the Periodic Table of Elements and mixtures thereof. (See page B-3, Handbook of Chemistry and Physics, Chemical Rubber Publishing Co. 47th Ed.) Suitable monovalent metal ions are $Na^+$, $K^+$, $Li^+$, $Cs^+$, $Ag^+$, $Hg^+$, and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Pb^{+2}$, $CO^{+2}$, $Ni^{+2}$ and $Zn^{+2}$.

The carboxylate ion of the metallic salt is derived from the following carboxylic acids as illustrated in the present invention; however, other carboxylic acids of the same generic class can be readily employed and are considered within the spirit and scope of the present embodiment. These carboxylic acids are: acetic, benzoic, lauric, palmitic, myristic, decanoic, octanoic, and stearic.

The metallic salt is dissolved in a mixed solvent of water and an aliphatic alcohol at a concentration level of about 30 to about 50 grams per 100 ml. of mixed solvent, wherein the water is about 40 to about 60 parts by volume of the mixed solvent. Suitable aliphatic alcohols are methanol, ethanol, isopropanol, n-propanol, isobutanol, n-butanol, or ethylene glycol. The solution of the neutralizing agent is added to the cement of the acid form of the sulfonated polymer to effect neutralization and form the metal salt of the sulfonated polymer.

Alternatively, an organic amine can be used as a neutralizing agent wherein the organic amine is dissolved in the mixed solvent at a concentration level of about 30 to about 50 grams per 100 ml. of mixed solvent. The aliphatic alcohol is about 60 to about 80 parts by volume of the mixed solvent. Typical aliphatic alcohols are methanol, ethanol, isopropanol, n-propanol, n-butanol, isobutanol, or ethylene glycol. The solution of amine neutralizing agent is added to the cement of the acid form of the sulfonated polymer to effect neutralization and form the amine salt of the sulfonated polymer.

The organic amines used to form the ionic bonds can be primary, secondary or tertiary amines, wherein the organic radicals are $C_1$ to $C_{30}$ alkyl, phenyl, aralkyl or alkaryl. More preferably, the organic radical is a phenyl, $C_1$ to $C_{10}$ alkyl, $C_7$ to $C_{10}$ alkylaryl or $C_7$ to $C_{10}$ aralkyl. Illustrative of such amines are anhydrous piperazine, triethylamine, tri-n-propylamine and tetraethylene-pentamine, piperazine and tri-n-propylamine.

Guanidines are preferred neutralizing agents for the sulfonic acid groups to produce ionic sites. The preferred guanidines are guanidine or substituted guanidines wherein the substituent organic radicals are $C_1$ to $C_{30}$ alkyl, phenyl, aralkyl or alkaryl. Illustrative of such guanidines are tetra-methyl guanidine, di-phenyl guanidine and di-orthotolyl guanidine.

The preferred neutralizing agents of the instant invention are barium stearate, barium acetate, zinc stearate, magnesium stearate, a mixture of barium acetate and stearic acid, and 1,3 di-ortho-tolyl guanidine. One method for blending the rubber and the vinyl is now described.

The polyvinyl chloride is slurried in an aromatic hydrocarbon at a concentration level of about 10 to about 20 grams per 100 ml. of aromatic hydrocarbon, wherein the aromatic hydrocarbon swells but does not dissolve the polyvinyl chloride. Typical aromatic solvents are benzene, toluene or xylene and mixtures thereof.

The cement of the neutralized sulfonated polymer and the slurried solution of the polyvinyl chloride are blended with stirring, and then precipitated with excess aliphatic alcohol, wherein the aliphatic alcohol is selected from the group consisting essentially of methanol, ethanol, isopropanol, n-propanol, isobutanol, n-butanol, or ethylene glycol or mixtures thereof. The precipitate is filtered and dried. The dried precipitate is fluxed on a two roll mill. Alternatively, the materials of the desired composition may be dry blended on a mill, or in a Banbury or other internal mixture.

Test specimens can be molded at 310° F. under 15,000 tons of pressure. Other forming conditions such as extrusion, injection molding, blow molding, vacuum forming, and solvent coating may be utilized.

The neutralized sulfonated polymer is incorporated as a minor portion into the blend composition at a concentration level of about 5 to about 45 parts per hundred by weight based on 100 parts of the polar thermoplastic resin; more preferably about 5 to about 20.

A preferential plasticizer for the sulfonate ionomer can be incorporated into the blend composition by adding the preferential plasticizer to the rubber or to the final blend compositions. The plasticizers aid in relaxing the ionic associations so that blending and processing are facilitated. The plasticizer composition (volatile and non-volatile) and methods of incorporation with the rubber are described in great detail by Canter and Buckley (U.S. Pat. No. 3,847,854). Examples include zinc stearate, magnesium stearate, and hexanol (volatile) and mixtures thereof.

Oils or waxes which are made soluble in the rubber phase can be added. These materials will aid in the dispersion of the rubber in the plastic.

A typical preferred paraffinic oil is Flexon 845 (Exxon Chemical Co.). The paraffinic wax should have an $\overline{M}n$ of about 1000 to about 4000; and more preferably about 1500 to about 3000.

To the thermoplastic blend compositions can be added a chemical additive, wherein the chemical or physical properties of the blend composition is further modified. These chemical additives are selected from the group consisting essentially of fillers, lubricants, plasticizers or pigments. These chemical additives are added at a concentration level of about 1 to about 200 parts per hundred by weight based on 100 parts of the thermoplastic resin, more preferably about 5 to about 100. These chemical additives are incorporated in the blend compositions by techniques well known in the art. For example, the additive can be incorporated into blend composition by dry compounding on a two roll mill. Other methods known in the art which are suitable for making these compositions include those methods employed in the plastic and elastomeric industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tanden extrusion techniques which are continuous mixing type equipment. The Banbury mixing device is the preferred batch type mixer, and the twin screw extruder is the preferred continuous mixer.

The fillers employed in the present invention are selected from carbon black, alumino-silicates, talcs, calcium silicate, ground calcium carbonate, water precipitated calcium carbonate, magnesium silicate, or delaminated, calcined or hydrated clays and mixtures thereof.

The pigments contemplated for use in the instant invention are selected from the group consisting essentially of inorganic or organic pigments and mixtures thereof.

The lubricants contemplated for use in the instant invention are non-polar waxes having an Mn of about 300 to about 1000, more preferably about 400 to about 750.

Plasticizer include phthalate esters, or adipate or sebacate esters typical of vinyl plasticization.

DETAILED DESCRIPTION

The advantages of both the rheological and physical properties of the blend compositions of the present invention can be more readily appreciated by reference to the following examples and tables.

EXAMPLE I

Four hundred grams of an EPDM terpolymer (Vistalon 2504) was dissolved in 8000 ml of n-heptane to form a cement. To the cement was added 44 ml of acetyl sulfate prepared at 20° C. from a mixture of 30 ml of acetic anhydride and 13 ml of concentrated sulfuric acid (96.5%). The sulfonation reaction was carried out with stirring for sixty minutes and then terminated with 4.0 ml. of methanol containing 0.40 grams of 2246 Antioxidant (American Cyanamide). The acid form of the sulfonated EPDM terpolymer having 40 meq. of $SO_3H$ groups was recovered from the cement by steam stripping. The dried crumb was ground and redissolved in a solvent mixture of 95 ml of toluene and 5 ml of methanol at a concentration level of 15 grams/100 ml of solvent.

Cements of 100 grams of the acid form of the sulfonated EPDM terpolymer were neutralized separately with five neutralizing agents with 2 meq/meq of acid 50/50 water/methanol mixture were used as the carrier solvents.

The neutralizing agents were barium stearate, zinc stearate, magnesium stearate, barium acetate and 1,3-di-o-tolyl-guanidine.

The five neutralized sulfonated EPDM terpolymers were isolated from the solution by steam stripping.

EXAMPLE II

Fifty grams of polyvinyl chloride K-65 (Imperial Chemical Co., Sarnia, Canada) was slurried in 300 ml of toluene which swelled but did not dissolve the polyvinyl chloride. Five solutions were prepared of the five neutralized sulfonated EPDM terpolymers of Example I by dissolving 5 grams each of the neutralized sulfonated EPDM terpolymer in 50 ml of a mixed solvent formed from 95 ml of toluene and 5 ml of methanol. Each solution of 5 grams of sulfonated EPDM terpolymer was added to a slurried solution of 50 grams of the polyvinyl chloride in toluene. The blend solutions of the neutralized sulfonated EPDM terpolymers and polyvinyl chloride was stirred for twenty hours, then precipitated with 3 liters of methanol, filtered, and dried thereby recovering the five thermoplastic blend compositions of 100 parts by weight of the polyvinyl chloride and 10 parts per hundred based on 100 parts of the polyvinyl chloride of the neutralized sulfonated EPDM terpolymer.

The five dried blend compositions were fluxed on a two mill at 310° F. until the sulfonated EPDM terpolymers were completely dispersed in the polyvinyl chloride. Test specimens for the five blend compositions were molded at 350° F. under 15,000 tons of pressure.

Figure 1:
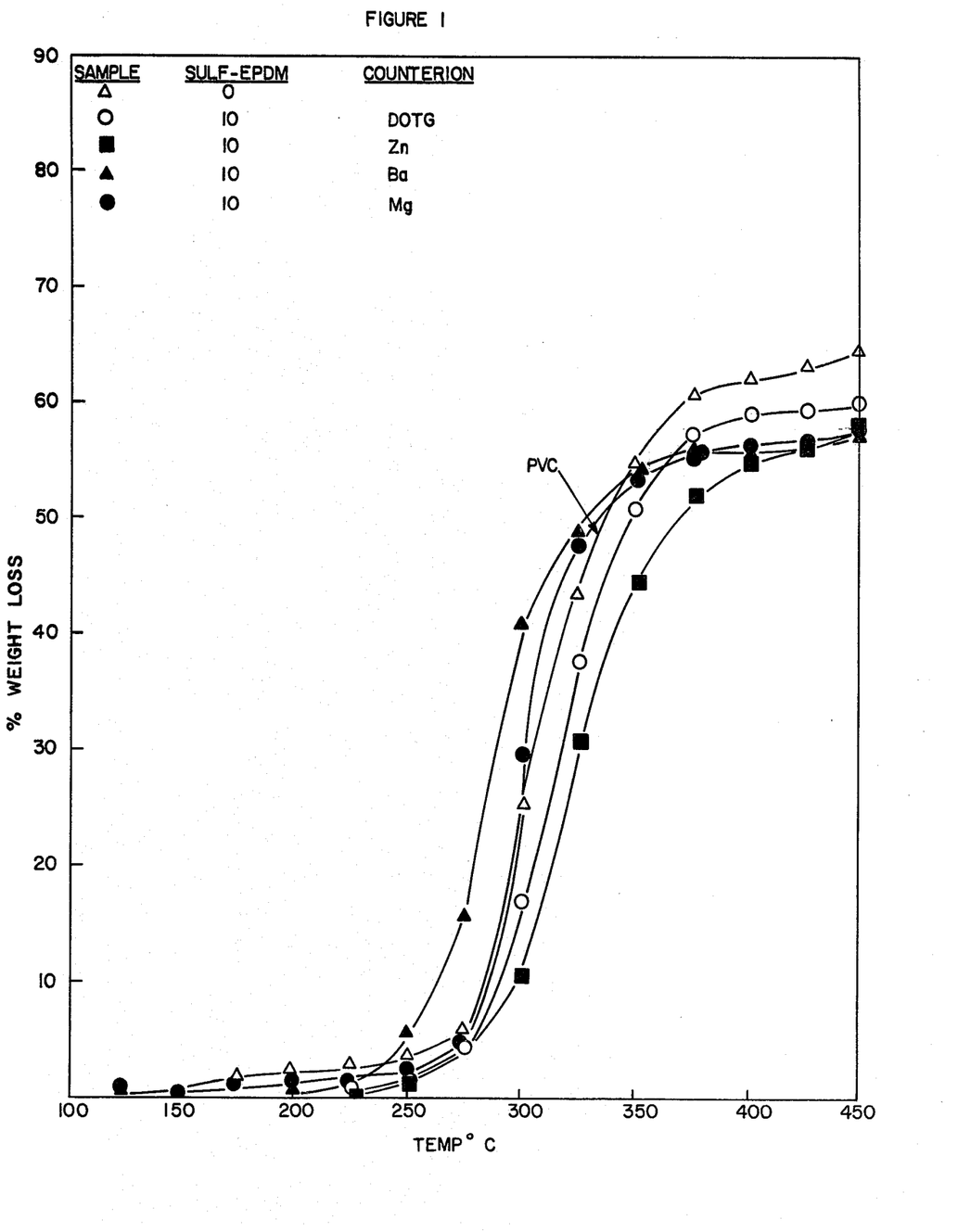
FIG. 1 illustrates a thermal gravametric analysis curve of % wt. loss versus temperature for the thermoplastic blend compositions.

The thermal stability of the thermoplastic blend compositions and of the polyvinyl chloride (control) were determined by Thermal Gravimetric Analysis (TGA) and color development. The samples were run on an Aminco TGA apparatus at a constant heating rate of 6° C./min from room temperature to 500° C. under a nitrogen atmosphere. FIG. 1 shows the TGA curves for the polyvinyl chloride and the blend compositions. At a 40% weight loss, the blends formed from the guanidine and barium stearate neutralized sulfonated EPDM terpolymers show an increase in thermal stability and the blends formed from zinc and magnesium neutralized sulfonated EPDM terpolymers cause a decrease in thermal stability. Zinc and magnesium ions act as accelerators in the decomposition of the polyvinyl chloride whereas barium and the guanidine function as stabilizers.

The resultant thermal stability at a 40% weight loss are:

| Sample | Thermal Stability at 40% wt. loss |
|---|---|
| Polyvinyl Chloride | 320° C. |
| Ba (stearate) Sulfonated EPDM | 340 |
| Zn Sulfonated EPDM | 300 |
| Mg Sulfonated EPDM | 310 |
| Guanidine Sulfonated EPDM | 330 |

At low levels of dehydrochlorination (wt. loss) that is less than 5 wt. percent, the four blend compositions appear to be more thermally stable than the polyvinyl chloride. It is this level of dehydrochlorination that is important in determining color development in polyvinyl chloride samples. This importance in thermal stability is confirmed by the color development in the molded samples. The molded samples of the blends appeared light brown to tan whereas the polyvinyl chloride sample appeared reddish brown.

Figure 2:
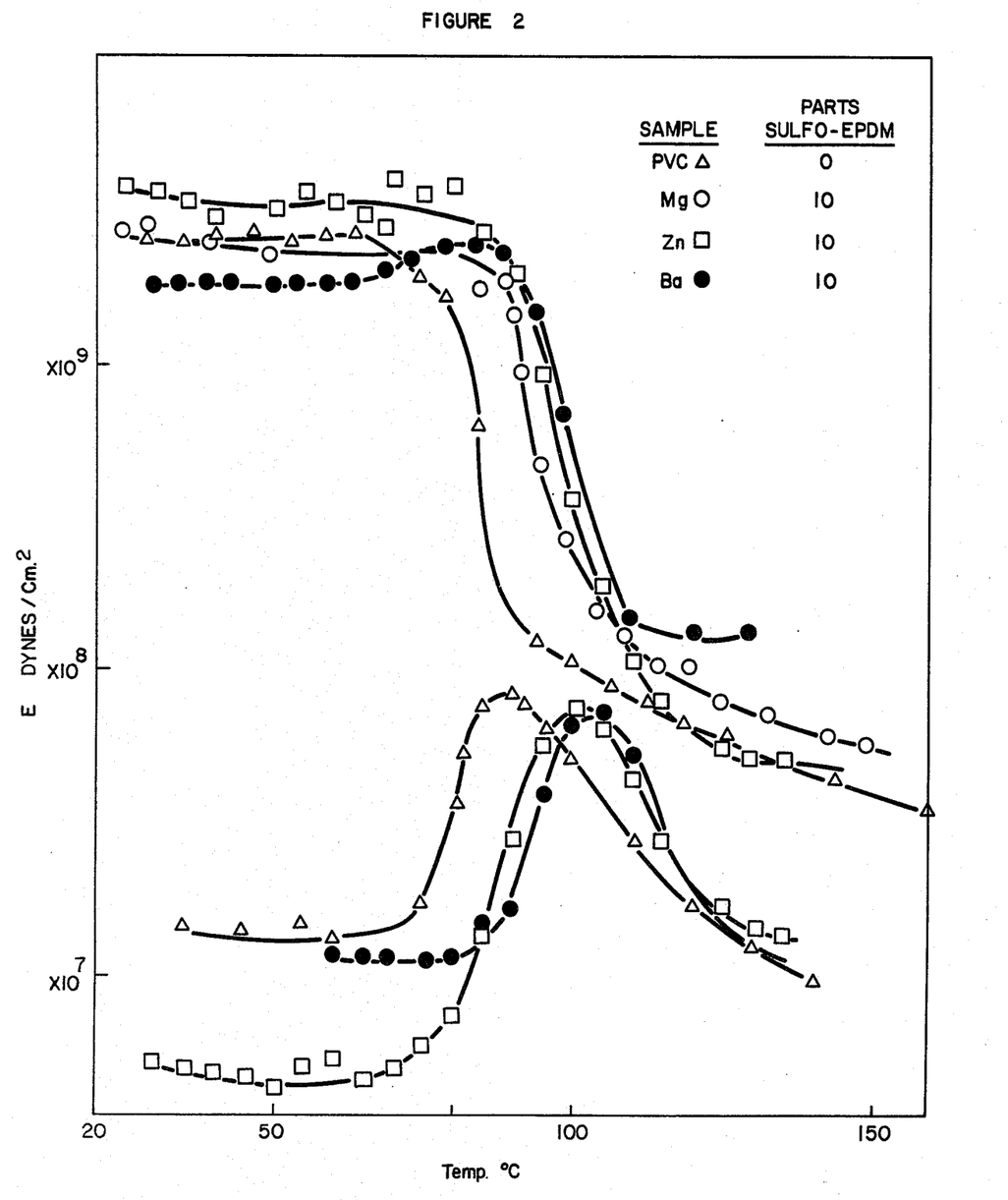
FIG. 2 illustrates the viscoelastic behavior of the thermoplastic blend compositions wherein the tensile modulus is plotted against temperature.
Figure 3:
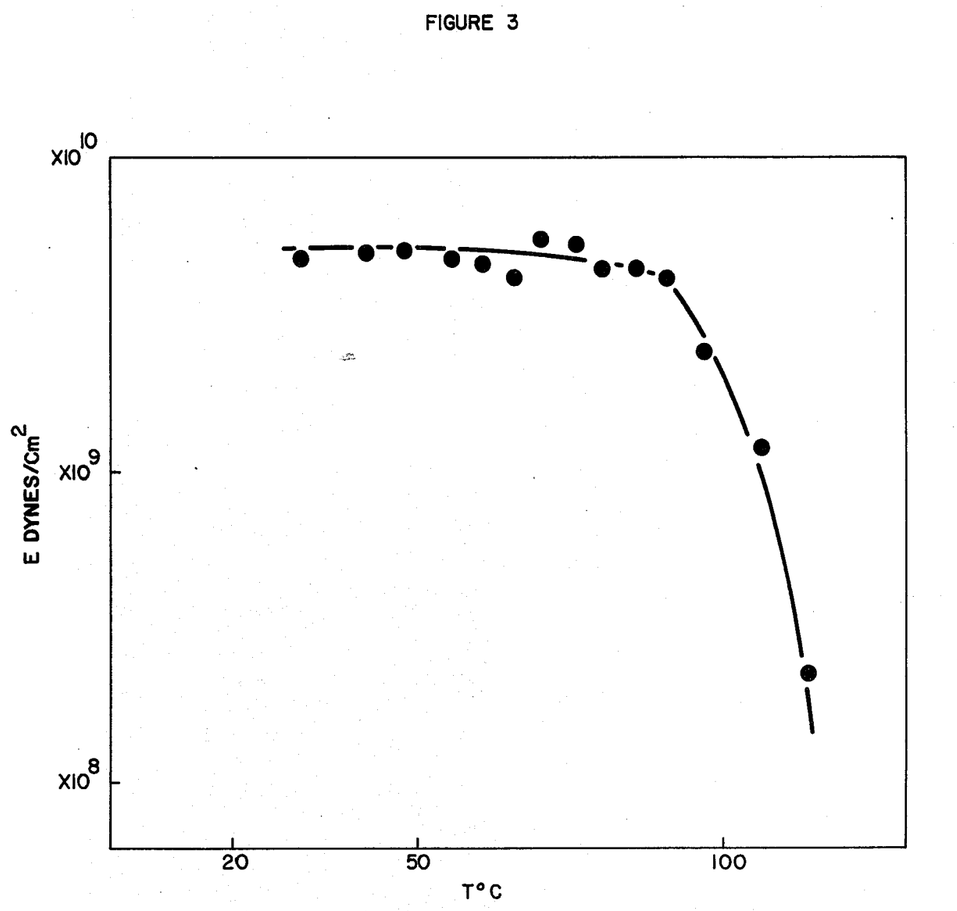
FIG. 3 illustrates the viscoelastic behavior of a barium acetate neutralized sulfonated EPDM terpolymer in a thermoplastic blend composition, wherein the tensil modulus is plotted against temperature.

The viscoelastic response to the thermoplastic blend compositions and the polyvinyl chloride control were measured on a vibron dynamic viscoelastomer from ambient temperature to 150° C. The results are illustrated in FIGS. 2 and 3. At $Ei=10^9$ (modulus inflection temperature) the blending of the metal neutralized sulfonated EPDM terpolymers with the PVC resulted in an increase in the glass transition; however, the amine neutralized sulfonated EPDM terpolymer had no effect on the glass transition.

| Sample | Glass Transition Temperature °C., $Ei=10^9$ |
|---|---|
| Polyvinyl Chloride | 82 |
| Guanidine Sulfonated EPDM Blend | 82 |
| Magnesium Sulfonated EPDM Blend | 91 |
| Zinc Sulfonated EPDM Blend | 95 |
| Barium Stearate Neutralized Sulfonated EPDM Blend | 96 |
| Barium Acetate Neutralized Sulfonated EPDM Blend | 96 |

The increase in the Ti of the blends is possibly due to the interactions of the sulfonate groups of the sulfonated EPDM terpolymer with the polar C-Cl groups of the polyvinyl chloride. These interactions probably result in a restriction of the motion of the polyvinyl chloride chains which causes the observed increase of the Ti. The carboxylate ion of the neutralizing agent has no effect on the glass transition, since blends from both barium acetate and barium stearate have the same glass transition temperature.

EXAMPLE III

One hundred grams of the blend composition of 100 parts of the polyvinyl chloride and 10 parts of the barium acetate neutralized sulfonated EPDM terpolymer was compounded with 10 parts of each of four plasticizers on a two roll mill according to the procedure of Example II. These plasticizers are:

| Plasticizer | Solubility Parameter of Plasticizer |
|---|---|
| Diisodecyl phthalate | 7.2 |
| Dimethyl phthalate | 10.7 |
| Dibutyl phthalate | 9.3 |

Figure 4:
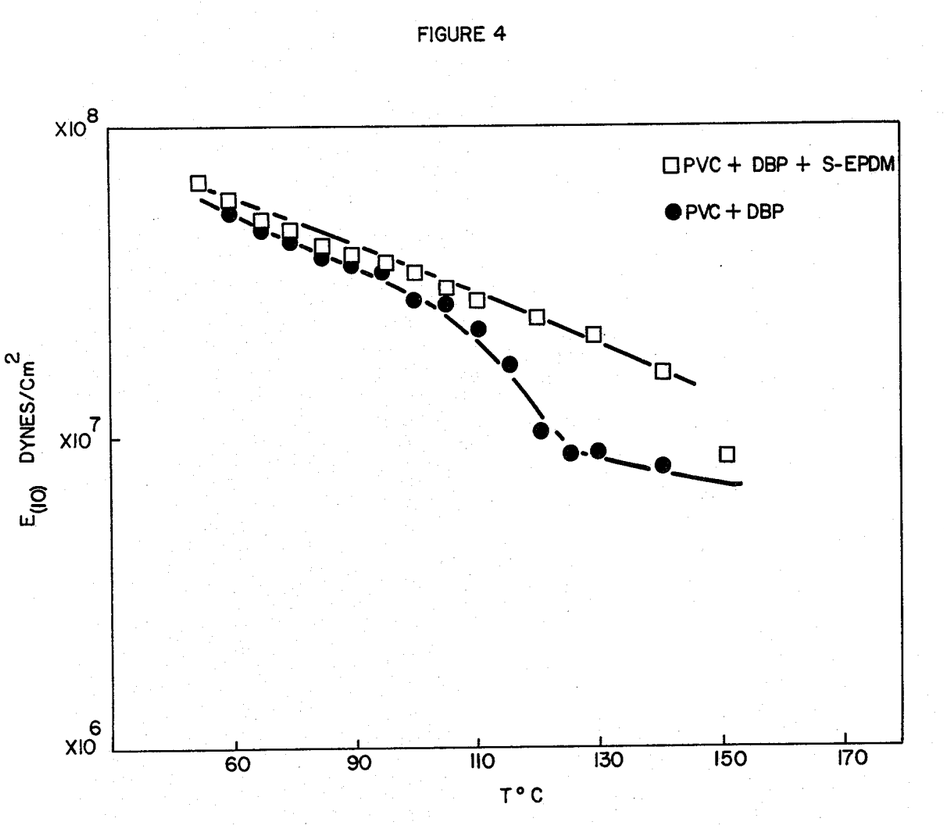
FIG. 4 illustrates the viscoelastic behavior of a thermoplastic blend composition modified with dibutyl phthalate wherein the tensile modulus is plotted against temperature.
Figure 5:
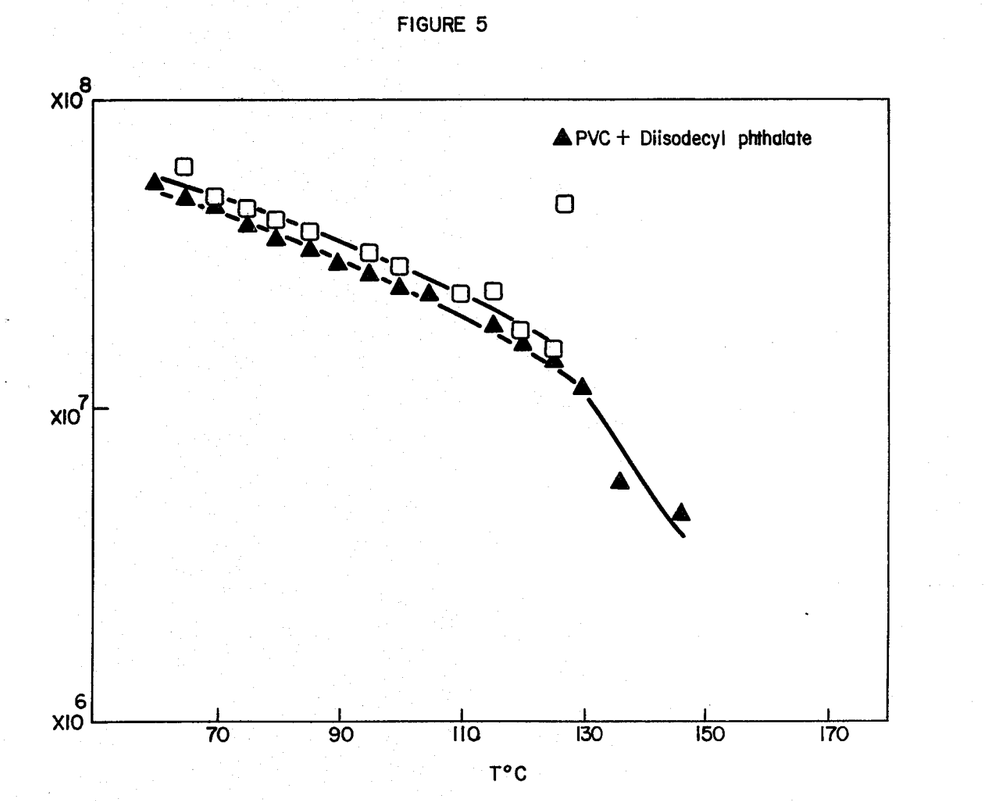
FIG. 5 illustrates the viscoelastic behavior of a thermoplastic blend composition modified with di-isodecyl phthalate, wherein the tensile modulus is plotted against temperature.
Figure 6:
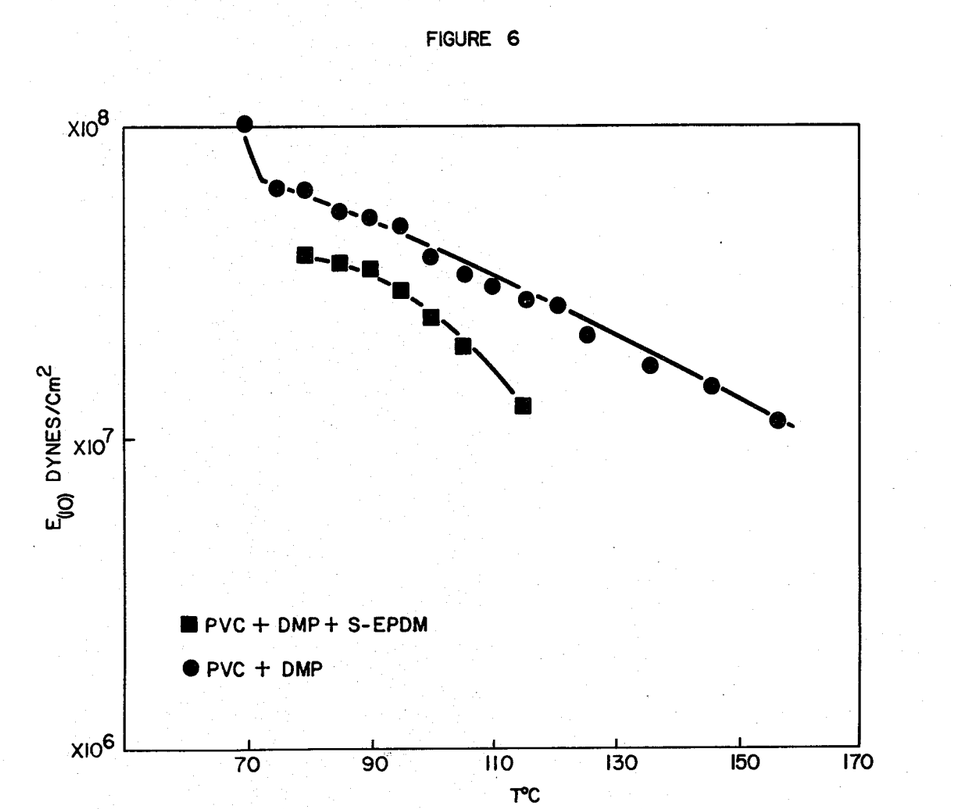
FIG. 6 illustrates the viscoelastic behavior of a thermoplastic blend composition modified with dimethyl phthalate, wherein the tensile modulus is plotted against temperature.

The viscoelastic response was measured for the three plasticized blend samples. FIGS. 3–5 show that as the solubility parameter of the plasticizer increases, the differences in modulus at $E=3\times10^8$ between the polyvinyl chloride and the plasticized blends also increases. At the higher solubility parameter, the $E=3\times10^8$ for the polyvinyl chloride sample occured at a higher temperature than for the corresponding blend of vinyl and sulfonated EPDM. At the lower solubility parameter, the $E=3\times10^8$ for the polyvinyl chloride sample occured at a lower temperature than the blend.

EXAMPLE IV

In order to increase the differences in stiffness between the blend and VPC, a plasticizer having a low solubility parameter was used, wherein the plasticizer is specific for the elastomeric phase. Flexon 845 (a nonpolar oil) having a solubility parameter of about 7.0 to 7.6 was used.

On a two roll mill at 310° F., the following compounds were made according to the procedure of Example II.

| | | Parts per hundred by weight |
|---|---|---|
| A. | Polyvinyl Chloride | 100 |
| | Flexon 845 | 10 |
| B. | Polyvinyl Chloride | 100 |
| | Ba Acetate Sulfonated EPDM | 10 |
| C. | Polyvinyl Chloride | 100 |
| | Ba Acetate Sulfonated EPDM | 10 |
| | Flexon 845 | 10 |

Figure 7:
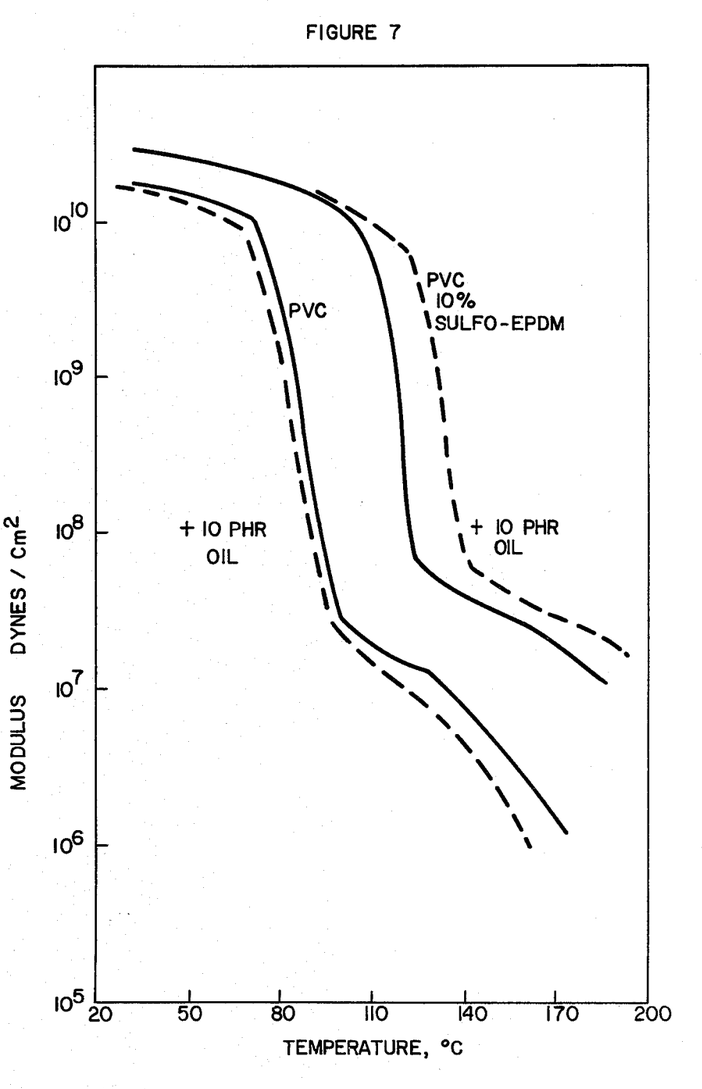
FIG. 7 illustrates the viscoelastic behavior of a thermoplastic blend modified with a paraffinic oil with and without sulfonated EPDM wherein the tensile modulus is plotted against temperature.

FIG. 7 illustrates the modulus temperature curves for these three compounds as well as for the polyvinyl chloride control. The incorporation of oil into the polyvinyl chloride appears to slightly lower the modulus at a given temperature. The incorporation of the sulfonated EPDM terpolymer increases the modulus at a given temperature. If oil is incorporated into the blend composition of the sulfonated EPDM terpolymer and the polyvinyl chloride, a further increase in modulus is realized.

EXAMPLE V

On a two roll mill at 310° F., blend compositions were made of the polyvinyl chloride and the barium acetate sulfonated EPDM terpolymer at three levels of concentration according to the procedure of Example II.

| | | Parts per hundred by weight |
|---|---|---|
| A. | Polyvinyl Chloride | 100 |
| | Barium Acetate Sulfonated EPDM | 5 |
| B. | Polyvinyl Chloride | 100 |
| | Barium Acetate Sulfonated EPDM | 10 |
| C. | Polyvinyl Chloride | 100 |
| | Barium Acetate Sulfonated EPDM | 15 |

Figure 8:
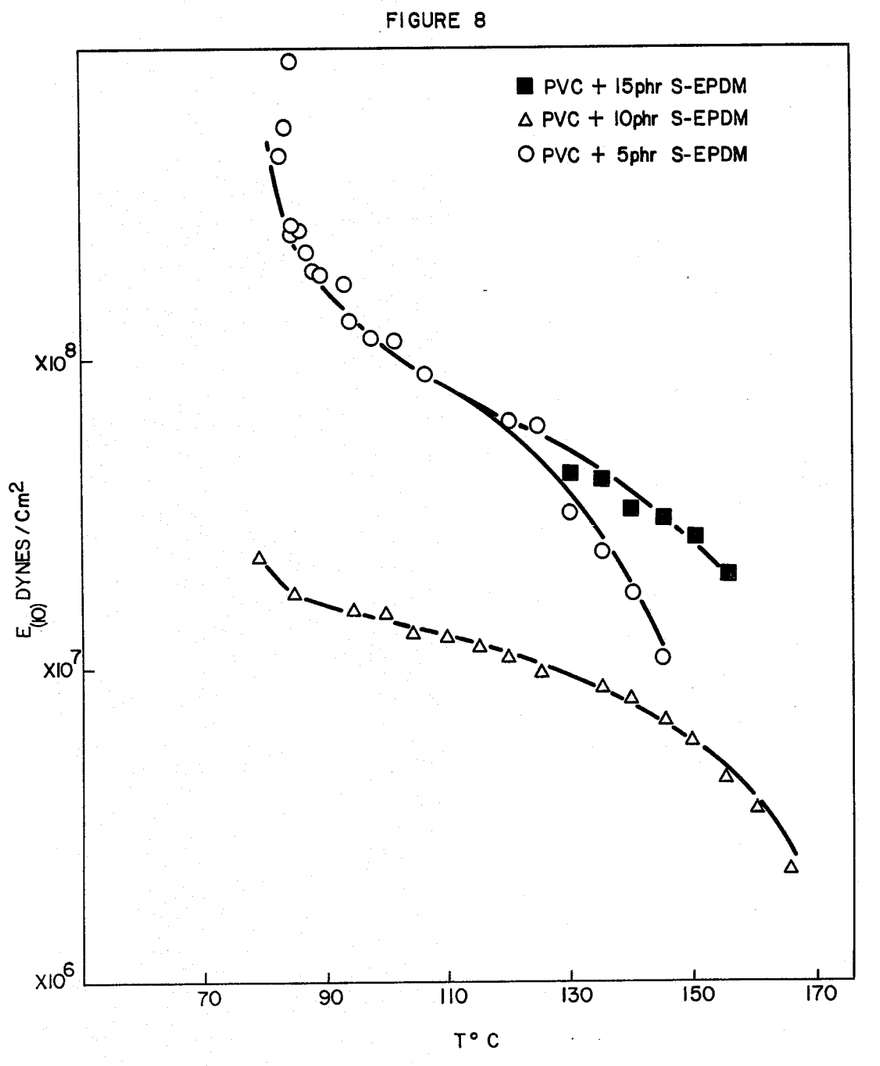
FIG. 8 illustrates the viscoelastic behavior for varying concentrations of the neutralized sulfonated EPDM terpolymer in the thermoplastic blend compositions, wherein the tensile modulus is plotted against temperature.

FIG. 8 illustrates the modulus values for these three blend compositions. The three blend compositions show progressively higher modulus values, indicating that the added sulfonate interaction enhances the modulus.

EXAMPLE VI

A sample of the EPDM 2504 terpolymer reprocessed to a 20 Mooney viscosity was sulfonated according to the produce of Example I, wherein the acid form of sulfonated EPDM terpolymer has 30 meq. of SO₃H groups. The product was neutralized with barium acetate. 5 PVC of stearic acid was present to act as a plasticizer. The neutralized sulfonated EPDM terpolymer was isolated by steam stripping. The dried neutralized sulfonated EPDM terpolymer was compounded with the polyvinyl chloride on a two roll mill at 310° F. according to the formula:

|  | Parts per hundred by weight |
|---|---|
| Polyvinyl Chloride | 100 |
| Neutralized Sulfonated EPDM | 11.1 |

Figure 9:
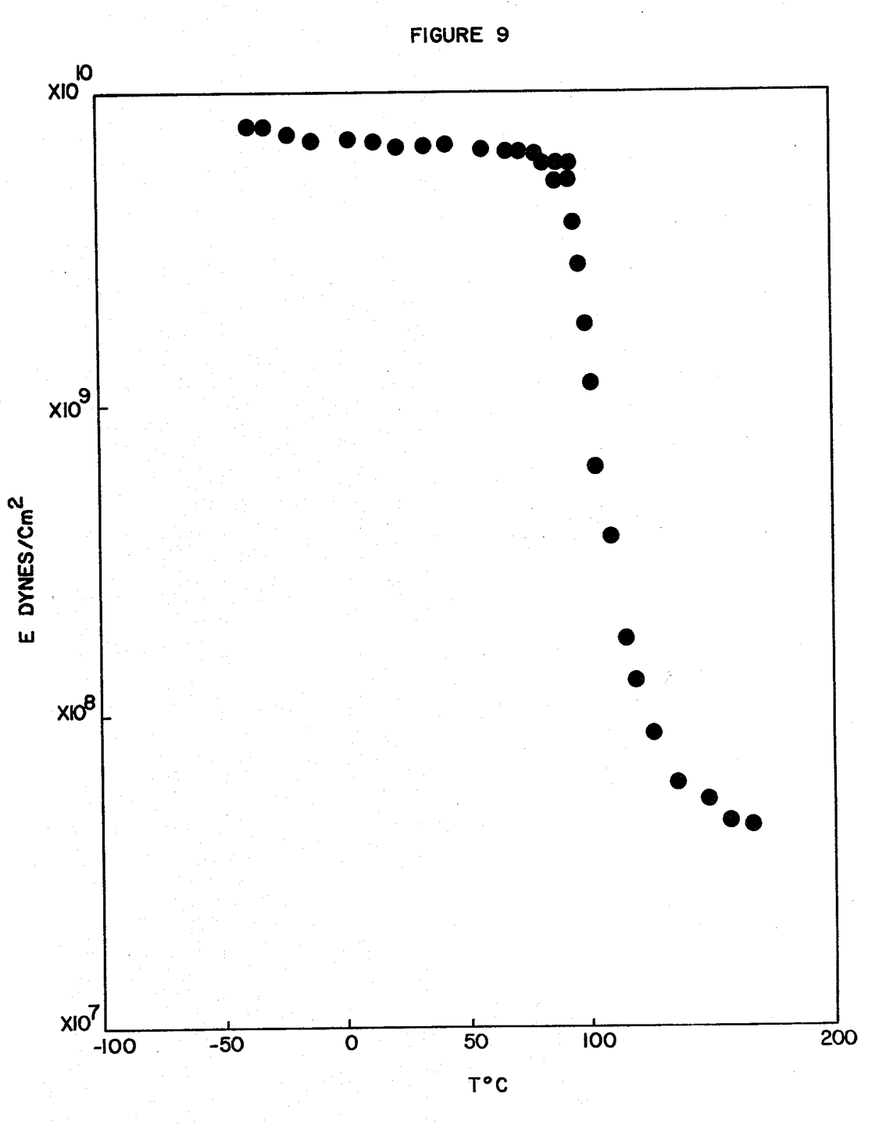
FIG. 9 illustrates the effect on viscoelastic behavior for the thermoplastic blend for varying molecular weight of the neutralized sulfonated EPDM terpolymer, wherein the tensile modulus is plotted against the temperature.

The modulus values for this blend composition as illustrated in FIG. 9, show that the initial modulus at $Ei=10^9$ occurs at 102° C. as compared to 96° C. as observed in FIG. 2. It is thought that the reduction of the Mooney viscosity, has aided in the dispersion of the rubber and enhanced its interaction with the continuous phase.

EXAMPLE VII

Figure 10:
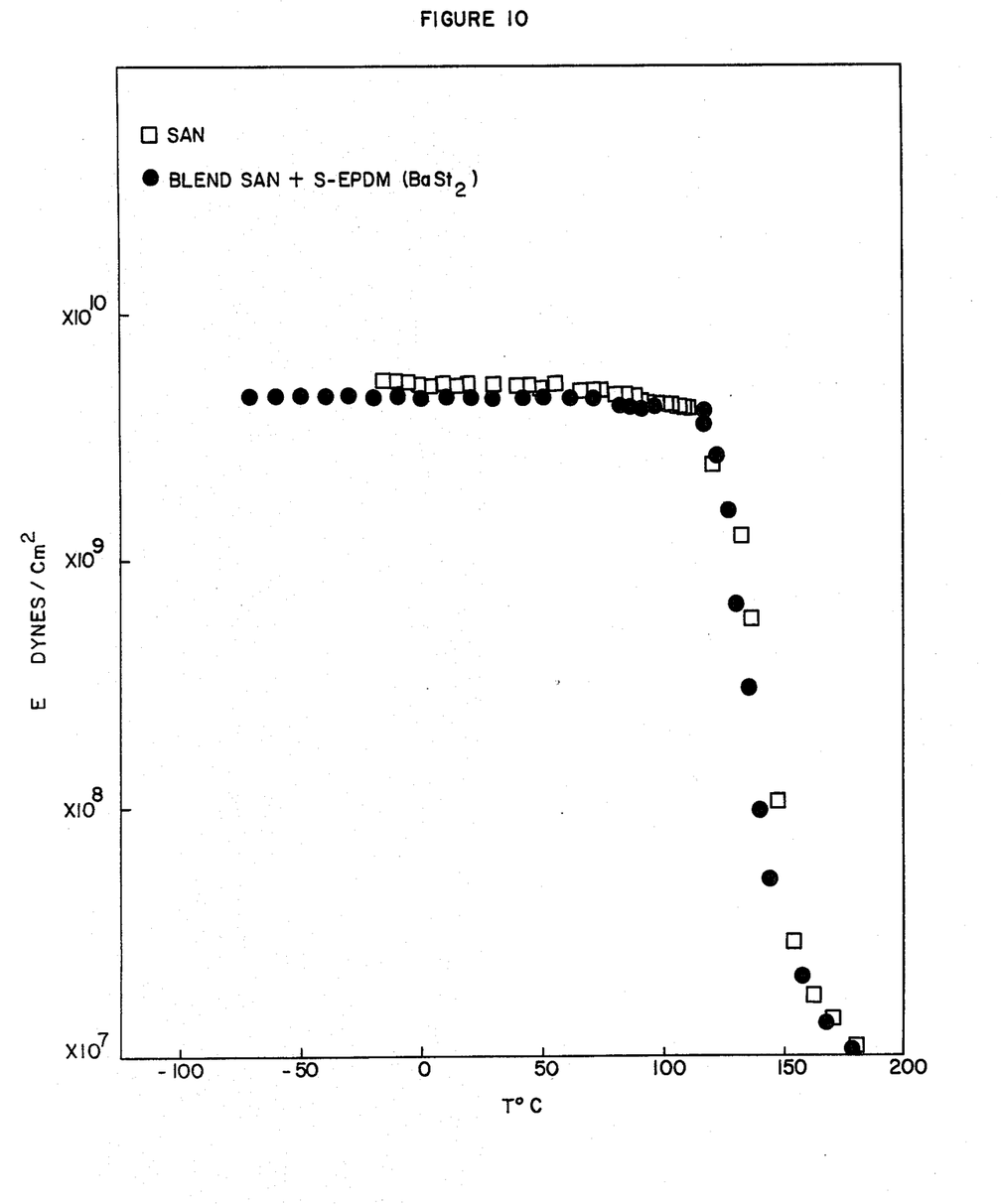
FIG. 10 illustrates the viscoelastic behavior for a blend of poly (styrene-co-acrylonitrile) and a barium salt of a sulfonated EPDM terpolymer, wherein the tensile modulus is plotted against temperature.
Figure 11:
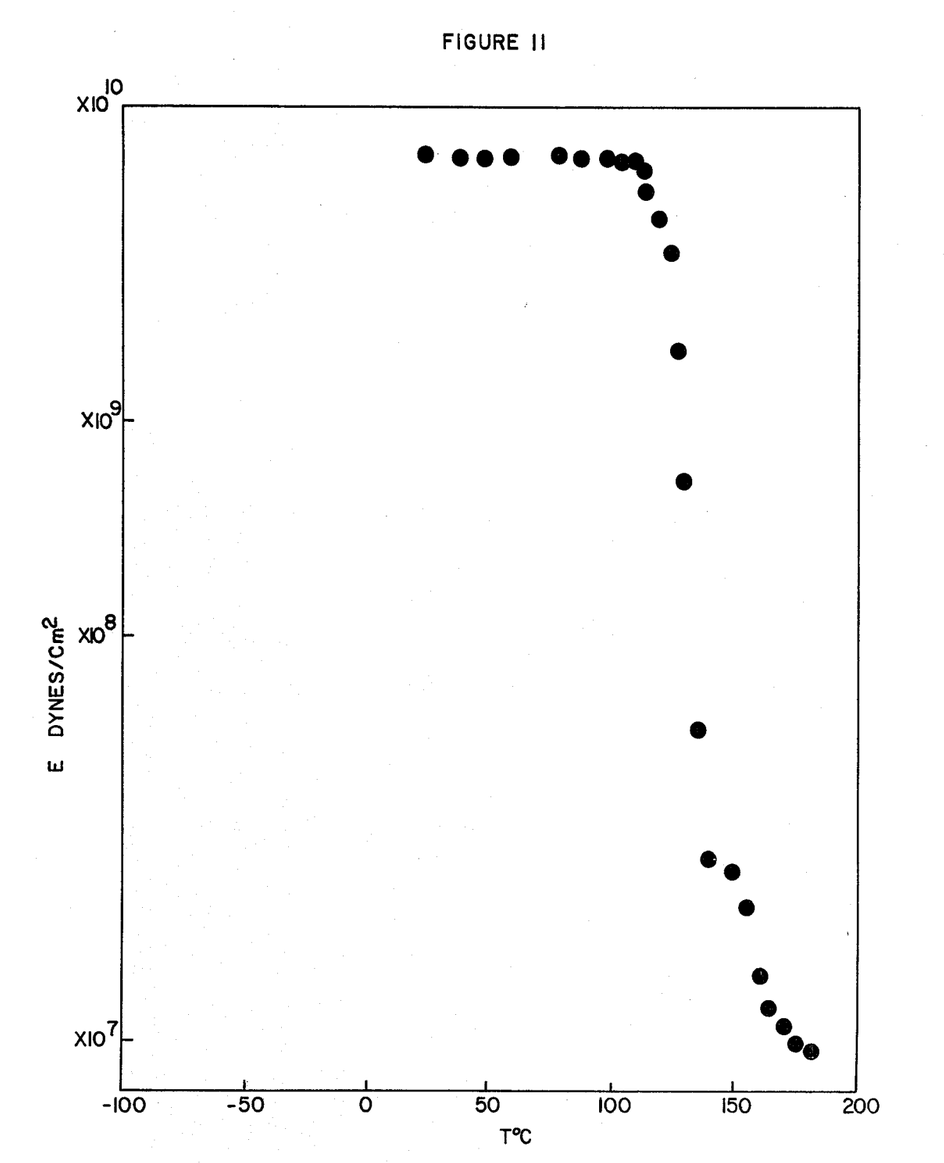
FIG. 11 illustrates the viscoelastic behavior of the blend of poly (styrene-co-acrylonitrile) with varying molecular weight the barium neutralized sulfonated EPDM terpolymer, wherein the tensile modulus is plotted against temperature.

Blends of a styrene-acrylonitrile (30%) copolymer and the dried crumb of the barium stearate neutralized sulfonated EPDM terpolymer of Examples I and VI were dissolved in a mixed solvent of 90 volume parts of toluene and 10 volume parts of methanol and stirred for twenty-four hours. The blend compositions of 100 parts by weight of styrene-acrylonitrile copolymer and 10 parts by weight of the neutralized sulfonated EPDM terpolymer were precipitated from solution with a large excess of methanol. The dried precipitates were compounded on a two roll mill at 310° F. and molded into test samples at 350° F. under 15,000 tons of pressure. The viscoelastic response was measured using the Vibron viscoelastomer for the blend compositions and the control (styrene-acrylnitrile copolymer). The Ti as seen in FIGS. 10 and 11 for both of the sulfonated blend compositions (with two different starting rubber molecular weights) occur at a lower temperature than the styrene-acrylonitrile control. This indicates that there is very little interaction between the nitrile groups and sulfonated EPDM as compared to the strong synergistic interaction observed for the halogen type polar bond (C-Cl) of the polyvinyl chloride and the neutralized ionic bond of the sulfonated EPDM.

The blend compositions of the polyvinyl chloride and the neutralized sulfonated EPDM terpolymer are ideally suited for use in hot water pipes, wherein the increased glass transition temperature allows for higher service temperatures. Through controlled plasticization by polar and non-polar oils, as well as via pigment incorporation, rigid as well as non-rigid applications are possible.

Since many modifications and variations of this invention may be made without departing from the spirit or scope of the invention thereof, it is not intended to limit the spirit or scope thereof to the specific examples thereof.

What is claimed is:

1. A polymeric blend composition which comprises:
   (a) a polyvinyl chloride resin; and
   (b) about 5 to about 20 parts by weight of a neutralized sulfonated elastomeric polymer per 100 parts by weight of said polyvinylchloride resin, said neutralized sulfonated elastomeric polymeric being formed from an elastomeric polymer being selected from the group consisting of a copolymer of an isoolefin and a conjugated multiolefin (Butyl rubber) and EPDM terpolymers, said blend having a glass transition temperature equal to or greater than a glass transition temperature of said polyvinyl chloride resin.

2. A composition according to claim 1, wherein said EPDM terpolymer has about 40 to about 80 wt. % of ethylene and about 2 to about 10 wt. % of a non-conjugated diene.

3. A composition according to claim 2, wherein said non-conjugated diene is selected from the group consisting of 1,4-hexadiene, dicyclopentadiene, alkylidene substituted norbornenes, methylene norbornene, or tetrahydroindene.

4. A composition according to claim 1, wherein said neutralized sulfonated polymer has about 10 to about 40 meq. sulfonate groups, at least 90% of which being neutralized with a neutralizing agent selected from the group consisting of metallic salts of carboxylic acids, organic amines, metallic hydroxides and mixtures thereof.

5. A composition according to claim 4, wherein a metal ion of said metallic salt of said carboxylic acid is selected from the group consisting of $Pb^{+4}$, $Sb^{+3}$, $Sl^{+3}$, $Fe^{+3}$, Groups I-A, II-A, I-B and II-B of the Periodic Table of Elements.

6. A composition according to claim 5, wherein said metal ion is barium.

7. A composition according to claim 1, wherein said composition includes a plasticizer having a solubility parameter of about 7 to about 11, a concentration level of said plasticizer being about 1 to about 60 parts by weight based on 100 parts by weight of said polyvinyl chloride resin.

8. A composition according to claim 7, wherein said plasticizer is selected from the group consisting of process oils, dialkyl phthalates, dialkyl adipates, dialkyl sulfonates and mixtures thereof.

* * * * *